United States Patent Office 2,725,384
Patented Nov. 29, 1955

2,725,384

PROCESS FOR PREPARING SUBSTITUTED PYRAZOLES

Donald M. Burness, Rochester, N. Y., assignor to Eastman Kodak Company, Rochester, N. Y., a corporation of New Jersey No Drawing. Application August 5, 1952, Serial No. 302,827

6 Claims. (Cl. 260—310)

This invention relates to an improved method for making substituted pyrazoles and isoxazoles.

It is well known that substituted pyrazoles can be prepared by condensing together a β-diketone, or hydroxymethylene derivatives of various ketones, with hydrazines (Richter—"The Chemistry of the Carbon Compounds," vol. IV, Elsevier Pub. Co., New York, 1947, pp. 92–94). Unfortunately, however, such methods are not particularly satisfactory due to the instability of the starting carbonyl compounds and the formation of isomeric mixtures.

I have found a new and improved process for making substituted pyrazoles which provides stable starting materials and substantial freedom from the formation of isomeric mixtures. I have further found that my new method can also be applied to the preparation of isoxazoles.

It is, accordingly, an object of my invention to provide a method for making substituted pyrazoles and isoxazoles.

Another object of my invention is to provide a method for making substituted pyrazoles and isoxazoles without the attendant disadvantages of the prior art methods. Other objects will become apparent from a consideration of the following description and examples.

According to my invention, briefly, I provide a new process for preparing substituted pyrazoles comprising condensing together a β-ketoacetal and a hydrazine. My process has the advantage that it can be carried out, either in a single step or in two steps. By using a two step process the formation of isomeric mixtures can be largely avoided.

The β-ketoacetals useful in practicing my invention can advantageously be represented by the following formula:

I
$$R-\overset{O}{\overset{\|}{C}}-\overset{R_1}{\underset{|}{C}H}CH(OR_2)_2$$

wherein R represents an alkyl group, such as methyl, ethyl, n-propyl, isopropyl, n-butyl, isobutyl, benzyl (phenylmethyl), β-phenylethyl, etc. or an aromatic group, such as phenyl, o-, m-, and p-tolyl, naphthyl, etc. (e. g. a mononuclear aromatic group of the benzene series), $R_1$ represents a hydrogen atom, an alkyl group (e. g. methyl, ethyl, n-propyl, isopropyl, n-butyl, isobutyl, benzyl, β-phenylethyl, etc.), or an aromatic group (e. g. phenyl, o-, m-, and p-tolyl, etc.), R and $R_1$ can together represent the atoms necessary to complete a carbocyclic nucleus (e. g. cyclopentanone, cyclohexanone, etc.), and $R_2$ represents an alkyl group, such as methyl, ethyl, n-propyl, isopropyl, isobutyl, n-butyl, etc. or an aromatic group, such as phenyl, o-, m-, and p-tolyl, etc. The β-ketoacetals of Formula I above can advantageously be prepared by condensing together a compound selected from those of the following general formula:

Ia
$$R-\overset{O}{\overset{\|}{C}}-\overset{R_1}{\underset{|}{C}}=CHCl$$

wherein R and $R_1$ have the values given above, with a hydroxy compound of the following formula:

Ib    $R_2$—OH wherein $R_2$ has the value given above, in the presence of a strongly alkaline material, such as sodium hydroxide, potassium hydroxide, etc. to produce the alkali metal derivative of the compounds of Formula Ib, or the said alkali metal compounds can be formed in a separate reaction and be used directly.

The hydrazines which can advantageously be used in preparing substituted pyrazoles according to my invention comprise those represented by the following general formula:

II    $R_3$—NHNH$_2$ wherein $R_3$ represents a hydrogen atom, an alkyl group (e. g. methyl, ethyl, n-propyl, n-butyl, etc.), an aromatic group (e. g. phenyl, o-, m-, and p-tolyl, o-, m-, and p-chlorophenyl, p-nitrophenyl, etc.), or an acyl group (e. g. acetyl, carbamyl, benzoyl, etc.).

As noted above, the substituted pyrazoles of my invention can be prepared by a one step or two step method, the latter being preferred, in general, due to higher yields and substantial freedom from isomeric mixtures. The one step process comprises condensing a compound selected from those of Formula I together with a compound selected from those of Formula II in the presence of a mineral acid (e. g. hydrochloric, phosphoric, sulfuric, etc. acids) or an alkaline material( e. g. alkali metal alkoxides, alkali metal hydroxides, etc.). Instead of using free mineral acid, an acid-addition salt of the hydrazine of Formula II can be used to equal advantage. Advantageously, the condensations are carried out in aqueous media (e. g. water, aqueous alcohol solutions, aqueous acetone solutions, etc.), although non-aqueous solvents can be used, though less advantageously. The one step process appears to be almost instantaneous, although heating can be employed where necessary, for example, when less soluble reactants are employed. Since the reaction is almost instantaneous and hydrolysis of certain reactants may occur upon prolonged contact with aqueous media, there is usually no advantage to effecting prolonged contact of reactants. The use of a mineral acid, or acid-addition salt of the hydrazine, is generally more advantageous than the use of an alkaline catalyst in the one step process. The reaction occurring in the one step process can be represented by the following equation:

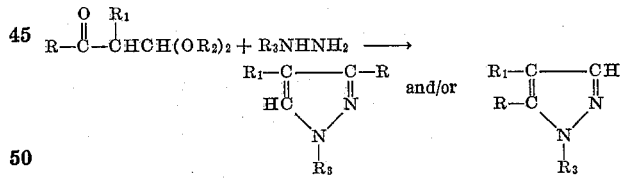

wherein R, $R_1$, $R_2$, and $R_3$ each have the values given above.

In preparing substituted pyrazoles by a two step method according to my invention, a β-ketoacetal selected from those of Formula I above is condensed with a hydrazine selected from those of Formula II in the absence of acidic or alkaline catalysts. The intermediate thus produced is then treated with a mineral acid or simply heated to give the desired pyrazole. This two step process produces an intermediate hydrazone, which may or may not be purified before completion of the reaction. An example of a specific condensation will clarify the procedure used:

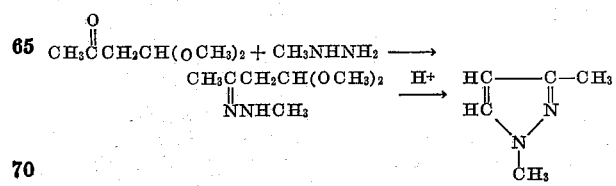

This two step process can be seen as advantageous in producing the 3-isomer. In many instances the method of the prior art using hydroxymethylene ketones gives mixtures, and attempts to circumvent this difficulty by the use of their esters or ethers have failed. (V. Auwers & Hollmann, "Berichte," vol. 59, 1926, page 1282). This can be attributed to 1, 4-addition of a portion of the base to the conjugated system, which is not possible when a ketoacetal reacts with a hydrazine base in the absence of acidic or alkaline catalysts.

The following examples will serve to illustrate more fully the manner whereby I practice my invention.

*Example 1.—3-methyl-1-phenylpyrazole*

To a solution of 10 parts of phenylhydrazine hydrochloride in 40 parts of a 50% water-ethanol mixture were added 8.8 parts of 4,4-dimethoxy-2-butanone. The solution was heated to boiling, allowed to stand, and the alcohol evaporated at reduced pressure. Unreacted phenylhydrazine was decomposed by boiling with copper sulfate. Extraction with ether and distillation of the dried ether extracts yielded 7.3 parts (70% yield) of 3-methyl-1-phenylpyrazole, B. P. 250–253° C.; M. P. 35–36° C.

*Example 2.—3-methyl-1-p-nitrophenylpyrazole*

A. A hot solution of 5.2 parts of p-nitrophenylhydrazine and 4.4 parts of 4,4-dimethoxy-2-butanone in 50 parts of alcohol was boiled on a steam bath to about one-half volume. Cooling yielded 7.5 parts of the yellow p-nitrophenylhydrazone, M. P. 133–134° C.

*Anal.*—Calc. for $C_{12}H_{17}O_4N_3$: C, 53.9; H, 6.4. Found: C, 53.9; H, 6.4.

B. A solution of 1 part of the p-nitrophenylhydrazone in 10 parts of ethanol was treated with 1 part of water and $\frac{1}{20}$ part of 6 N hydrochloric acid and heated for 10 minutes. Cooling gave 0.70 part of 3-methyl-1-p-nitrophenylpyrazole as long yellow needles, M. P. 165.5° C. This represents an overall yield (parts A and B) of 78%.

*Example 3.—3- and 5-methyl-1-phenylpyrazoles*

A solution of 8.8 parts of 4,4-dimethoxy-2-butanone, 7.2 parts of freshly distilled phenylhydrazine and 13.5 parts of a methanolic solution of sodium methoxide (from 1.5 parts of sodium) was heated under reflux for two hours. It was then cooled, and benzene added. The benzene solution was filtered, washed with water, the solvent evaporated, and the residual oil distilled at reduced pressure to give 5.5 parts (52% yield) of crude product, B. P. 115–125° C. (9 mm.). Redistillation gave a nearly colorless oil, B. P. 120–122° C. (9 mm.); $n_D^{28.5}$ 1.5858.

*Anal.*—Calcd. for $C_{10}H_{10}N_2$: C, 75.9; H, 6.4; N, 17.7. Found: C, 75.6; H, 6.7; N, 17.0.

From this oil, by crystallization from petroleum ether, pure 3-methyl-1-phenylpyrazole, M. P. 35–36° C., was separated.

*Example 4.—3-methylpyrazole*

To a suspension of 9 parts of hydrazine sulfate in 20 parts of water, were added 8.8 parts of 4,4-dimethoxy-2-butanone. The mixture was heated on the steam bath until solution was complete, and allowed to stand several hours at room temperature. After the addition of 18 parts of potassium hydroxide, the pyrazole was extracted thoroughly with ether, the extracts dried and distilled. 3-methylpyrazole was obtained as a colorless oil in 73% yield (4 parts); B. P. 200° C.; $n_D^{25}$ 1.4952.

*Example 5.—1,3- and 1,5-dimethylpyrazoles*

A solution of 35.2 parts of 4,4-dimethoxy-2-butanone and 39 parts of methylhydrazine sulfate in 40 parts of water was heated on the steam bath for ten minutes, and allowed to stand at room temperature for several hours. Solid potassium hydroxide was added until the pyrazole separated, which then was extracted with ether. The extracts were dried and distilled to give 17.5 parts of a mixture of 1,3- and 1,5-dimethylpyrazoles (as determined by their picrates); B. P. 141–150° C.; $n_D^{26}$ 1.4713–1.4745.

*Example 6.—1,3-dimethylpyrazole*

A. Three parts of methylhydrazine was added dropwise, with cooling, to 8.6 parts of 4,4-dimethoxy-2-butanone. The mixture was allowed to warm up to 40° C.; and heated on the steam bath for ten minutes to complete formation of the methylhydrazone.

B. To 5.5 parts of the crude hydrazone in 5 parts of water were added 5.3 parts of 6 N hydrochloric acid (solution then strongly acid) and the solution was heated for 20 minutes on the steam bath. Addition of 2.4 parts of 50% aqueous sodium hydroxide solution produced separation of the pyrazole which was isolated as in Example 5. The overall yield of 1,3-dimethylpyrazole (lack of 1,5-isomer demonstrated via the picrate) was 61%; B. P. 143–145° C.; $n_D^{25.4}$ 1.4732.

*Example 7.—3-methylpyrazole-1-carbonamide*

To a solution of 3.5 parts of semicarbazide hydrochloride in 10 parts of water were added gradually 4.4 parts of 4,4-dimethoxy-2-butanone. The temperature of the mixture was held below 45° C. by cooling. After one-half hour at room temperature, the mixture was cooled, filtered, and washed with water; yield 3.35 parts (85%). Recrystallization from methanol gives the pure 3-methylpyrazole-1-carbonamide, M. P. 123.5–124.5° C., in large, irregular, colorless columns.

*Anal.*—Calc. for $C_5H_7N_3O$: C, 48.0; H, 5.6; N, 33.6. Found: C, 48.2; H, 5.5; N, 33.5.

In a manner similar to that illustrated above for preparing substituted pyrazoles, substituted isoxazoles can be prepared by replacing the hydrazines of Formula II with hydroxylamine or its acid-addition salts, for example:

$$R-\overset{O}{\underset{\|}{C}}-\overset{R_1}{\underset{|}{C}}HCH(OR_2)_2 + NH_2OH \longrightarrow$$

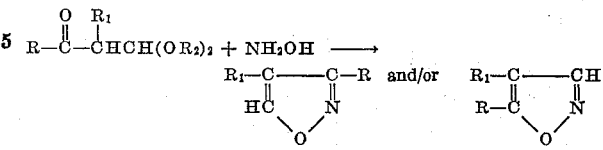

wherein R, $R_1$, and $R_2$ each have the values given above. The following example will serve to illustrate the manner whereby I prepare substituted isoxazoles according to the new method of my invention.

*Example 8.—3- and 5-methylisoxazoles*

In a manner similar to that of Example 4 (omitting the heating), the reaction of equivalent amounts of 4,4-dimethoxy-2-butanone and hydroxylamine hydrochloride yielded a mixture of 3- and 5-methylisoxazoles as a colorless liquid; B. P. 118° C.; $n_D^{25.5}$ 1.4362. The product was shown to consist of about equal parts of the two isomers.

The pyrazoles and isoxazoles prepared in accordance with my invention are useful as solvents, chemical intermediates for the preparation of drugs, insecticides, and the like. Certain of the pyrazoles are useful as intermediates in the preparation of compounds useful as sensitizers for certain types of photographic emulsions. (Wizinger & Albrecht, "Angew. Chem.," vol. 62, 1950, p. 335.)

What I claim as my invention and desire secured by Letters Patent of the United States is:

1. A process for preparing substituted pyrazoles comprising condensing together a β-ketoacetal selected from those represented by the following general formula:

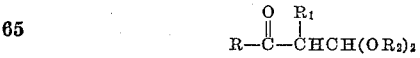

wherein R represents a member selected from the group consisting of an alkyl group containing from 1 to 8 carbon atoms and a monocyclic aromatic group of the benzene series containing from 6 to 10 carbon atoms, $R_1$ represents a member selected from the group consisting of a hydrogen atom, an alkyl group containing from 1 to 8 carbon atoms, and a monocyclic aromatic group of the benzene series containing from 6 to 7 carbon atoms, and R and $R_1$ together represent the atoms necessary to complete a nucleus selected from the group consisting of cyclopentanone and cyclohexanone, and $R_2$ represents an alkyl group containing from 1 to 4 carbon atoms, with a hydrazine selected from those represented by the following general formula:

$$R_3-NHNH_2$$

wherein $R_3$ represents a member selected from the group consisting of a hydrogen atom, an alkyl group containing from 1 to 4 carbon atoms, a monocyclic aromatic group of the benzene series containing from 6 to 7 carbon atoms, and an acyl group of a carboxylic acid, and acidifying the reaction product.

2. A process for preparing 3-methyl-1-(p-nitrophenyl)-pyrazole comprising condensing 4,4-dimethoxy-2-butanone with p-nitrophenylhydrazine, followed by acidification of the reaction product.

3. A process for preparing 1,3-dimethylpyrazole comprising condensing 4,4-dimethoxy-2-butanone with methylhydrazine, followed by acidification of the reaction product.

4. A process for preparing substituted pyrazoles comprising condensing together a β-ketoacetal selected from those represented by the following general formula:

$$R-\overset{O}{\underset{}{C}}-\overset{R_1}{\underset{}{C}}HCH(OR_2)_2$$

wherein R represents a member selected from the group consisting of an alkyl group containing from 1 to 8 carbon atoms and a monocyclic aromatic group of the benzene series containing from 6 to 10 carbon atoms, $R_1$ represents a member selected from the group consisting of a hydrogen atom, an alkyl group containing from 1 to 8 carbon atoms, and a monocyclic aromatic group of the benzene series containing from 6 to 7 carbon atoms, and R and $R_1$ together represent the atoms necessary to complete a nucleus selected from the group consisting of cyclopentanone and cyclohexanone, and $R_2$ represents an alkyl group containing from 1 to 4 carbon atoms, with a hydrazine selected from those represented by the following general formula:

$$R_3-NHNH_2$$

wherein $R_3$ represents a member selected from the group consisting of a hydrogen atom, an alkyl group containing from 1 to 4 carbon atoms, a monocyclic aromatic group of the benzene series containing from 6 to 7 carbon atoms, and an acyl group of a carboxylic acid, to give the hydrazone of said β-ketoacetal, acidifying the reaction mixture, and heating the said reaction mixture to give the desired substituted pyrazole.

5. A process for preparing 3-methyl-1-(p-nitrophenyl)-pyrazole comprising condensing 4,4-dimethoxy-2-butanone with p-nitrophenyl hydrazine to give the hydrazone of said 4,4-dimethoxy-2-butanone, acidifying the reaction mixture and heating the said reaction mixture to give the desired 3-methyl-1-(p-nitrophenyl)pyrazole.

6. A process for preparing 1,3-dimethylpyrazole comprising condensing 4,4-dimethoxy-2-butanone with methylhydrazine to give the hydrazone of said 4,4-dimethoxy-2-butanone, acidifying the reaction mixture and heating the said reaction mixture to give 1,3-dimethylpyrazone.

References Cited in the file of this patent

UNITED STATES PATENTS

| | | |
|---|---|---|
| 1,879,210 | Hahl | Sept. 27, 1932 |
| 2,260,256 | Lippincott | Oct. 21, 1941 |
| 2,288,863 | Wenner | July 7, 1942 |
| 2,515,160 | Copenhaver | July 11, 1950 |

OTHER REFERENCES

Wiley et al.: "Organic Syntheses," vol. 31, pp. 43–44 (1951).

Claisen: Ber. Deut. Chem., vol. 36, p. 3666 (1903).